United States Patent
Tsai et al.

(10) Patent No.: US 9,642,087 B2
(45) Date of Patent: May 2, 2017

(54) METHODS FOR REDUCING THE POWER CONSUMPTION IN VOICE COMMUNICATIONS AND COMMUNICATIONS APPARATUS UTILIZING THE SAME

(71) Applicant: MediaTek Inc., Hsin-Chu (TW)

(72) Inventors: Chia-Hung Tsai, Hsinchu (TW); Chien-Chun Huang-Fu, Hsinchu (TW); Yih-Shen Chen, Hsinchu (TW); Ju-Ya Chen, Kaohsiung (TW); Yu-Syuan Jheng, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 55 days.

(21) Appl. No.: 14/632,118

(22) Filed: Feb. 26, 2015

(65) Prior Publication Data
US 2016/0183188 A1   Jun. 23, 2016

Related U.S. Application Data

(60) Provisional application No. 62/093,561, filed on Dec. 18, 2014.

(51) Int. Cl.
| | |
|---|---|
| *G06F 11/00* | (2006.01) |
| *H04J 1/16* | (2006.01) |
| *H04L 1/00* | (2006.01) |
| *H04L 12/26* | (2006.01) |
| *H04W 52/02* | (2009.01) |
| *H04W 28/02* | (2009.01) |
| *H04M 7/00* | (2006.01) |
| *H04W 52/26* | (2009.01) |
| *H04W 52/36* | (2009.01) |
| *H04L 12/823* | (2013.01) |

(52) U.S. Cl.
CPC ......... *H04W 52/0229* (2013.01); *H04L 47/32* (2013.01); *H04M 7/0072* (2013.01); *H04W 28/0221* (2013.01); *H04W 28/0236* (2013.01); *H04W 28/0284* (2013.01); *H04W 52/265* (2013.01); *H04W 52/365* (2013.01); *Y02B 60/50* (2013.01)

(58) Field of Classification Search
CPC ......... H04W 52/0229; H04W 28/0221; H04W 52/265; H04M 7/0072; H94W 28/0236
USPC ................................. 370/311, 252, 253, 254
See application file for complete search history.

(56) References Cited

U.S. PATENT DOCUMENTS

| | | | |
|---|---|---|---|
| 7,190,972 B1 * | 3/2007 | Hollister | H04L 29/06027 455/411 |
| 2002/0120440 A1 * | 8/2002 | Zhang | G10L 25/78 704/215 |

(Continued)

*Primary Examiner* — Chuong T Ho
(74) *Attorney, Agent, or Firm* — McClure, Qualey & Rodack, LLP (57) ABSTRACT

A method for reducing power consumption when a communications apparatus establishes voice communications with another communications apparatus includes estimating a voice quality perceived by a user of the another communications apparatus; determining whether the estimated voice quality is higher than a predetermined threshold; and adjusting at least one parameter utilized for processing a plurality of voice packets to be transmitted to the another communications apparatus according to the estimated voice quality to reduce the power consumption when the estimated voice quality is higher than the predetermined threshold.

20 Claims, 11 Drawing Sheets

(56) References Cited

U.S. PATENT DOCUMENTS

2009/0141631 A1* 6/2009 Kim .................. H04L 43/08
370/235
2009/0259475 A1* 10/2009 Yamagami ............. G10L 13/10
704/276
2013/0225097 A1* 8/2013 Hong .................. H04B 15/00
455/77

* cited by examiner

Mean opinion score (MOS)

| MOS | Quality | Impairment |
|---|---|---|
| 5 | Excellent | Imperceptible |
| 4 | Good | Perceptible but not annoying |
| 3 | Fair | Slightly annoying |
| 2 | Poor | Annoying |
| 1 | Bad | Very annoying |

FIG. 3

| R-factor | Quality of voice rating | MOS |
|---|---|---|
| 90 < R < 100 | Best | 4.34 - 4.5 |
| 80 < R < 90 | High | 4.03 - 4.34 |
| 70 < R < 80 | Medium | 3.60 - 4.03 |
| 60 < R < 70 | Low | 3.10 - 3.60 |
| 50 < R < 60 | Poor | 2.58 - 3.10 |

TX Types: "S" = SPEECH; "F" = SID_FIRST; "U" = SID_UPDATE; "N" = NO DATA
$N_{elapsed}$: No. of elapsed frames since last SID_UPDATE

METHODS FOR REDUCING THE POWER CONSUMPTION IN VOICE COMMUNICATIONS AND COMMUNICATIONS APPARATUS UTILIZING THE SAME

CROSS REFERENCE TO RELATED APPLICATIONS

This application claims the benefit of U.S. Provisional Application No. 62/093,561 filed 2014 Dec. 18 and entitled "Method of Quality-Aware Energy Saving", and the entire contents of which are hereby incorporated by reference.

BACKGROUND OF THE INVENTION

Field of the Invention

The invention relates to methods for reducing the power consumption in voice communications, and more particularly for reducing the power consumption while maintaining voice quality in voice communications.

Description of the Related Art

Many different types of digital electronic devices require a communications capability. The number and type of devices has grown dramatically, and each device category, manufacturer, and service may have a wide range of device platforms and operating systems, and multiple application environments, and are required to interoperate across many networks and systems. Since applications typically are device and service specific, this has limited the availability and use of new functions and capabilities to selected devices. The time and investment required to implement a new capability across an entire, complex device portfolio continues to increase as the range and type of devices increases. Developers, device suppliers, and service providers need a better means to support many device types and models with lower incremental time, cost, and risk to fully utilize investments and to offer services and value to more customers and markets.

Long Term Evolution ("LTE") is a relatively recent standard developed by the Third Generation Partnership Project ("3GPP") for wireless communication of high speed data for mobile phones and data terminals. Voice over LTE ("VoLTE") has become the preferred industry choice for providing voice services over LTE. However, implementation of LTE on digital electronic devices has been hindered by power consumption issues and, in the case of VoLTE, long implementation lead times.

Therefore, methods for improving the power consumption while maintaining voice quality of VoLTE are required.

BRIEF SUMMARY OF THE INVENTION

Communications apparatus and method for reducing power consumption when a communications apparatus establishes voice communications with another communications apparatus are provided. An exemplary embodiment of a communications apparatus comprises a radio frequency (RF) signal processing device, a baseband signal processing device and a processor. The RF signal processing device is arranged to process a plurality of RF signals for establishing voice communications with another communications apparatus. The baseband signal processing device is arranged to process a plurality of baseband signals corresponding to the RF signals, wherein the baseband signals carry a plurality of voice packets comprising voice data to be transmitted to the another communications apparatus. The processor is coupled to the RF signal processing device and the baseband signal processing device, arranged to estimate a voice quality perceived by a user of the another communications apparatus and adjust at least one parameter utilized for processing the voice packets according to the estimated voice quality to reduce power consumption for transmitting the voice packets.

An exemplary embodiment of a method for reducing power consumption when a communications apparatus establishes voice communications with another communications apparatus comprises estimating a voice quality perceived by a user of the another communications apparatus; determining whether the estimated voice quality is higher than a predetermined threshold; and adjusting at least one parameter utilized for processing a plurality of voice packets to be transmitted to the another communications apparatus according to the estimated voice quality to reduce the power consumption when the estimated voice quality is higher than the predetermined threshold.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
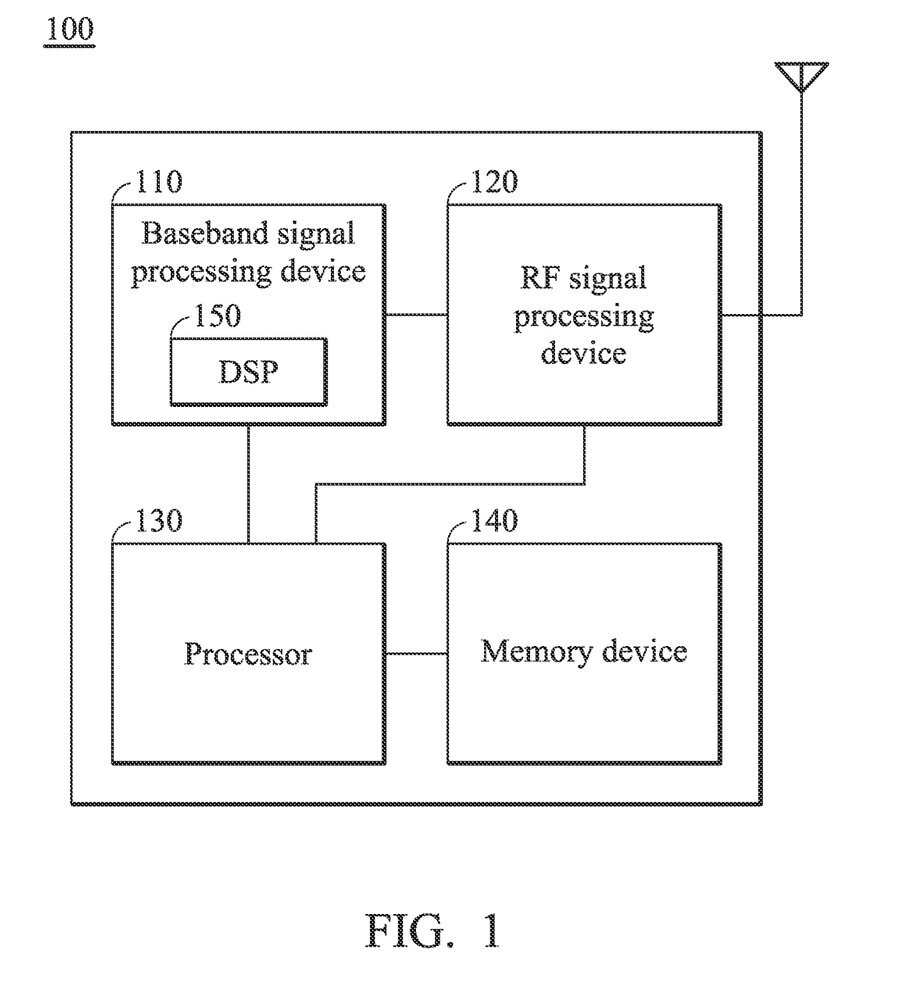
FIG. 1 is a block diagram of a communications apparatus according to an embodiment of the invention.

FIG. 1 is a block diagram of a communications apparatus according to an embodiment of the invention. The communications apparatus 100 may comprise at least a baseband signal processing device 110, a radio frequency (RF) signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to another communications apparatus. The RF signal processing device 120 may comprise a plurality of hardware elements to perform radio frequency conversion. For example, the RF signal processing device 120 may comprise a power amplifier, a mixer, or others.

The baseband signal processing device 110 may further process the baseband signals to obtain information or data transmitted by another communications apparatus. In the embodiments of the invention, the baseband signals may carry a plurality of voice packets comprising voice data to be transmitted to another communications apparatus. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on. For example, the baseband signal processing device 110 may comprise a Digital Signal Processor (DSP) 150. Note that in some embodiments of the invention, the baseband signal processing device 110 may also be regarded as a modem processor.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device 110 and/or the RF signal processing device 120. The memory device 140 may store the software and firmware program codes, system data, user data, etc. . . . of the communications apparatus 100.

Note that in some embodiments of the invention, the processor 130 may be configured inside of the baseband signal processing device 110, or the processor 130 and the baseband signal processing device 110 and/or the RF signal processing device 120 may be integrated together as a whole in a system on chip (SOC), or the communications apparatus 100 may comprise another processor configured inside of the baseband signal processing device 110. Thus the invention should not be limited to the architecture as shown in FIG. 1.

According to an embodiment of the invention, the communications apparatus 100 may establish voice communications with another communications apparatus. The voice communications may be VoLTE voice communications. In order to reduce the power consumption, the processor 130 may be arranged to estimate a voice quality perceived by user of another communications apparatus, and adjust at least one parameter utilized for processing a plurality of voice packets to be transmitted to another communications apparatus according to the estimated voice quality. Note that, in order to maintain adequate voice quality of the voice communications such that the user of the peer communications apparatus will not feel uncomfortable due to the parameter adjustment, the processor 130 may further keep estimating the voice quality and adjust the parameter when the estimated voice quality is higher than a predetermined threshold.

Figure 2:
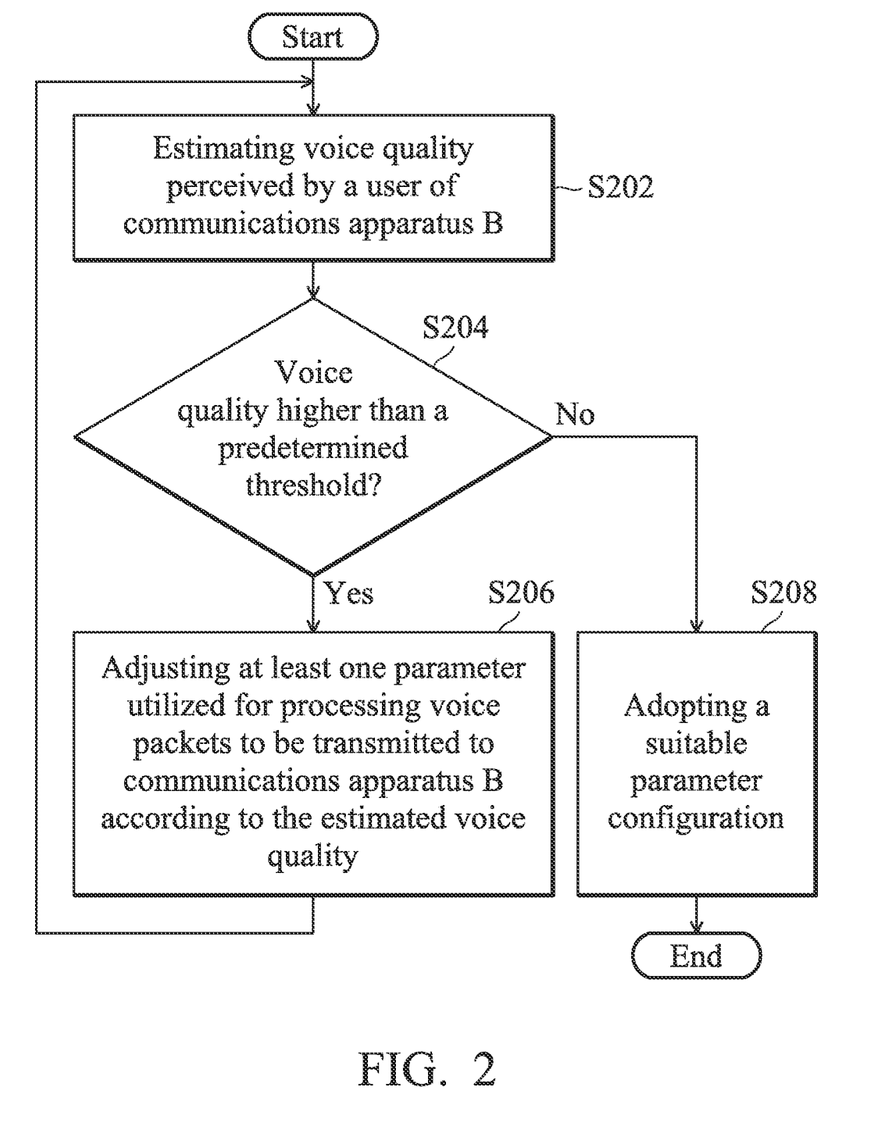
FIG. 2 is a flow chart of a method for reducing power consumption of a communications apparatus establishing voice communications with another communications apparatus according to an embodiment of the invention.

FIG. 2 is a flow chart of a method for reducing power consumption when a communications apparatus establishes voice communications with another communications apparatus according to an embodiment of the invention. First of all, the processor 130 of the communications apparatus 100 (hereinafter called communications apparatus A) may estimate a voice quality perceived by a user of another communications apparatus (hereinafter called communications apparatus B) (Step S202). Next, the processor 130 of communications apparatus A may determine whether the estimated voice quality is higher than a predetermined threshold (Step S204). When the estimated voice quality is higher than the predetermined threshold, the processor 130 of communications apparatus A may adjust at least one parameter utilized for processing a plurality of voice packets to be transmitted to communications apparatus B according to the estimated voice quality (Step S206). The process may then return to step S202 for communications apparatus A to keep monitoring the voice quality perceived by communications apparatus B. When the estimated voice quality is not higher than the predetermined threshold, the processor 130 of communications apparatus A may adopt a suitable parameter configuration (Step S208), so as to maintain the voice quality that is higher than the predetermined threshold. Note that the previous parameter configuration corresponding to each parameter adjustment made in Step S206 may be recorded in the memory device 140 such that the previous parameter configuration may be recovered in step S208.

According to an embodiment of the invention, the suitable parameter configuration may be determined or selected from one or more historical parameter configurations that the processor adopted before, the previous parameter configuration that the processor previously adopted, or the configurations that are defined or supported by the corresponding specifications or standards. These candidate parameter configurations for determining or selecting the suitable parameter configuration may be recorded in the memory device 140.

According to an embodiment of the invention, the processor 130 may estimate the voice quality perceived by the user of communications apparatus B based on an International Telecommunication Union (ITU) E-model. The E-model is a computational model that can be used to predict voice quality non-intrusively and directly from the network and other system parameters as listed below:

$$R=R_O-Is-Id-Ie+A \qquad \text{Eq. (1)}$$

where R factor represents the estimated voice quality, Ro is the inherent SNR-dependent quality of the audio, Is is the sum of all impairments which may occur more or less simultaneously with the voice transmission, (Ro–Is) has been assumed to be a constant, Id is the impairment to the audio quality due to delay, Ie is the impairment to the audio quality due to errors (the errors may be the loss of voice packet), and A is the advantage factor.

By applying the default parameters, the E-Model can be simplified to:

$$R = 93.2 - Id - Ie \qquad \text{Eq. (2)}$$

The R factor may also be mapped to a Mean Opinion Score (MOS). The MOS is a test that has been used for decades in telephony networks to obtain the human user's view of the quality of the perceived voice or the conversation. MOS is a subjective measurement where listeners would sit in a "quiet room" and score call quality as they perceived it.

Figure 3:
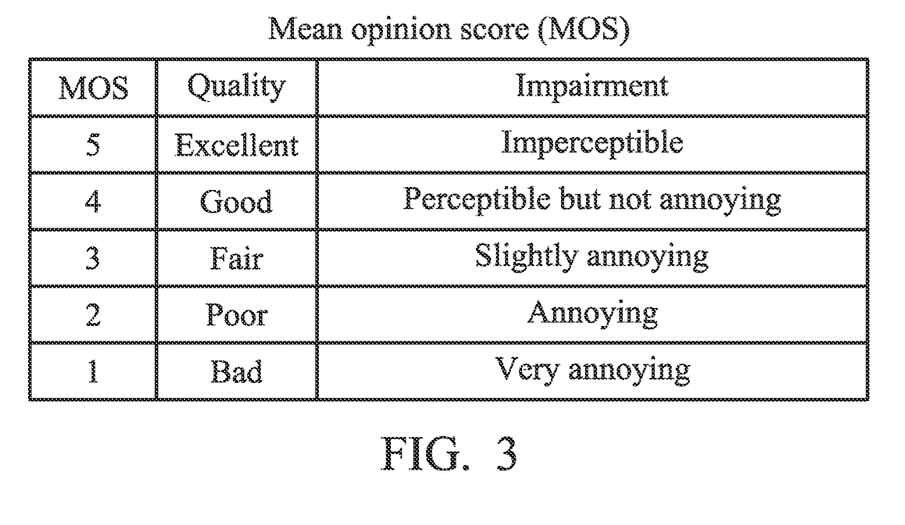
FIG. 3 is an exemplary table showing the voice quality perceived by the user versus the MOS.
Figure 4:
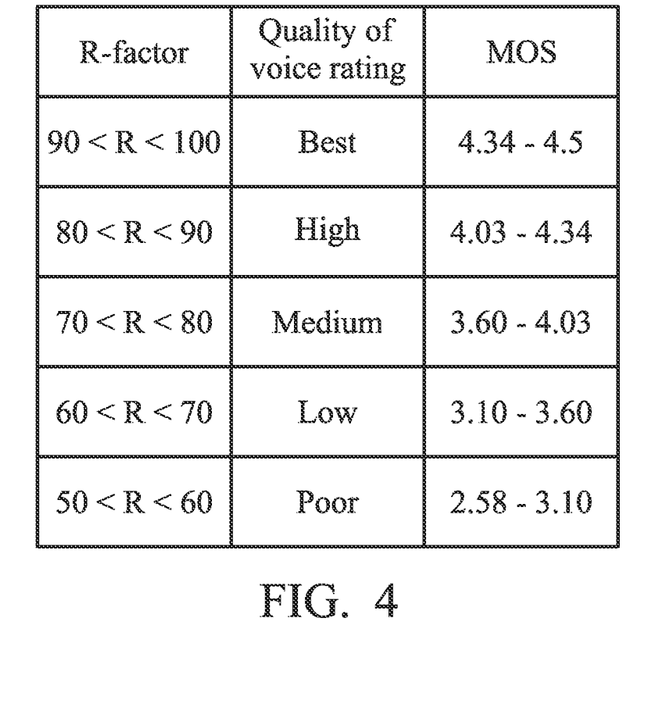
FIG. 4 is an exemplary table showing the mapping relationship between the R factor and the MOS.

FIG. 3 is an exemplary table showing the voice quality perceived by the user versus the MOS. FIG. 4 is an exemplary table showing the mapping relationship between the R factor and the MOS. In the embodiments of the invention, the estimated voice quality may be the R factor or the MOS.

According to an embodiment of the invention, based on equation (2), the processor 130 may estimate the voice quality according to a packet loss rate (corresponding to the parameter Ie) of the voice packets and a packet delay (corresponding to the parameter Id) of the voice packets received by communications apparatus B. In one embodiment of the invention, the processor 130 of communications apparatus A may obtain information regarding the packet loss rate and the packet delay from a Real time Transport Control Protocol (RTCP) frame received from communications apparatus B. The RTCP frame is periodically transmitted from communications apparatus B to provide feedback on the quality of service (QoS) to communications apparatus A. In another embodiment of the invention, the processor 130 of communications apparatus A may obtain information regarding the packet loss rate and the packet delay from the downlink Packet Loss Rate (PLR) and packet delay low bounds guaranteed by the operators.

In some embodiments of the invention, after obtaining the estimated voice quality, the processor 130 of communications apparatus A may further check whether a power-saving indication has been set. The power-saving indication may be set when power-saving is required. For example, the power-saving indication may be set when remaining battery power of communications apparatus A is lower than a predefined threshold, and the power-saving indication may be cancelled when communications apparatus A is connected to a charging device for battery charging. For another example, the power-saving indication may also be set or cancelled by the user.

Figure 5:
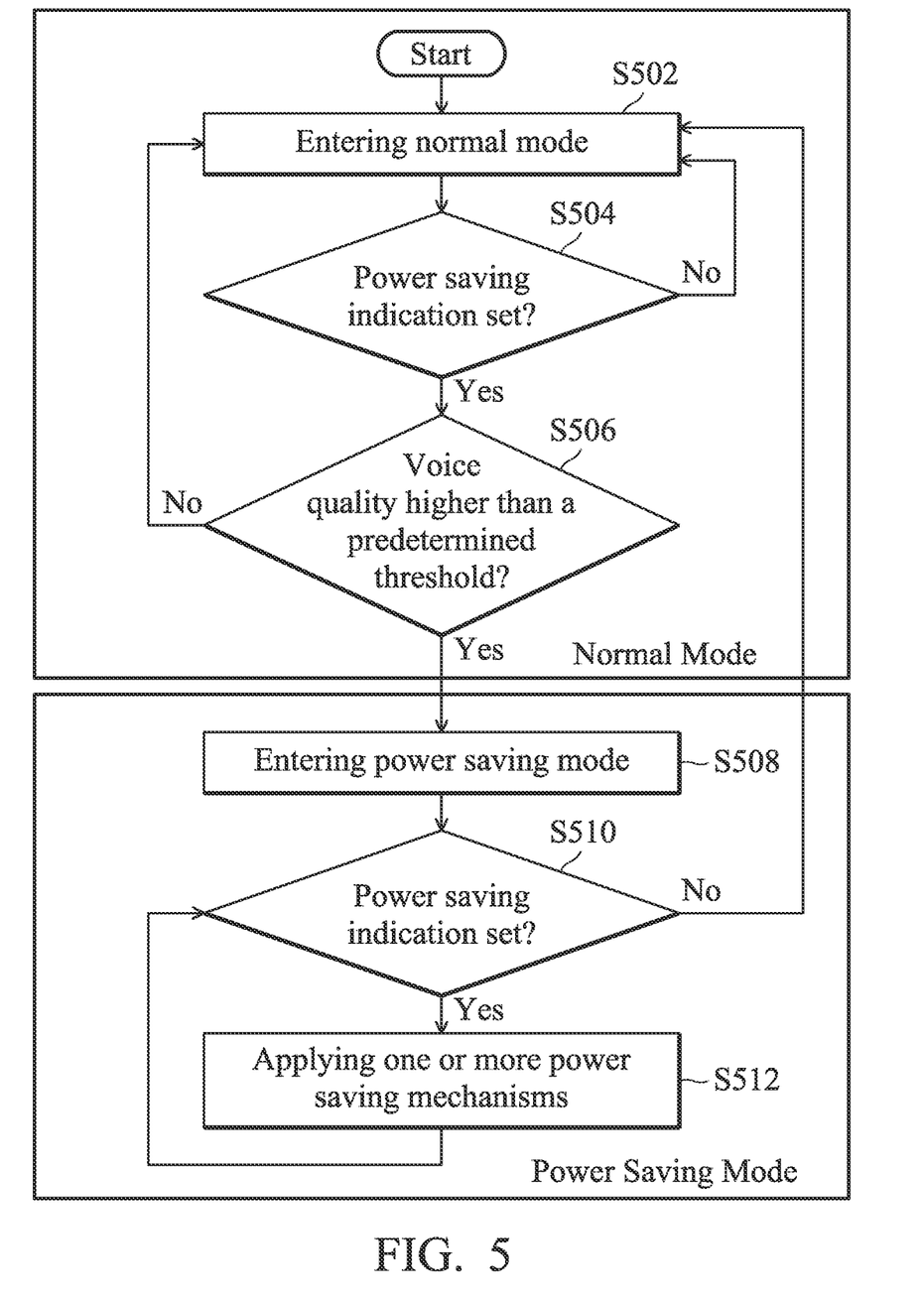
FIG. 5 is a flow chart showing the concept of switching between a normal mode and a power-saving mode of a communications apparatus according to an embodiment of the invention.

FIG. 5 is a flow chart showing the concept of switching between a normal mode and a power-saving mode of a communications apparatus according to an embodiment of the invention. Communications apparatus A may enter a normal mode and operate in the normal mode by default (Step S502). Next, the processor 130 may check whether a power-saving indication has been set (Step S504). If not, communications apparatus A may still operate in the normal mode. If yes, the processor 130 may further check whether the estimated voice quality is higher than the predetermined threshold (Step S506). If not, communications apparatus A may still operate in the normal mode. If yes, communications apparatus A may enter a power-saving mode (Step S508).

In the power-saving mode, the processor 130 may check again whether a power-saving indication is set (Step S510) since the power-saving condition may be changed anytime as discussed above. If not, communications apparatus A may still operate in the normal mode. If yes, the processor 130 may apply one or more power-saving mechanisms by adjusting at least one parameter utilized for processing a plurality of voice packets to be transmitted to communications apparatus B according to the estimated voice quality (Step S512). Several proposed power-saving mechanisms will be further discussed in the following paragraphs.

According to an embodiment of the invention, the parameter may be a codec mode utilized for coding the voice data to be transmitted to communications apparatus B. To be more specific, the processor 130 may adjust the codec mode according to the estimated voice quality.

Figure 6:
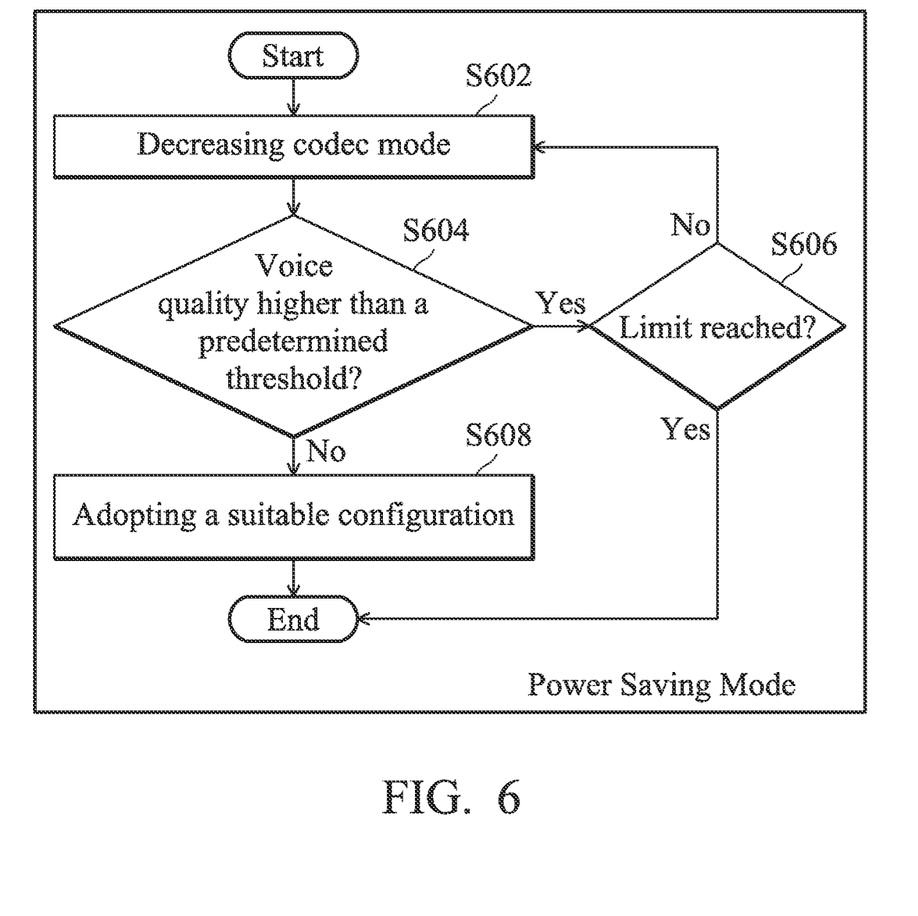
FIG. 6 is a flow chart of a method for adjusting a codec mode for power-saving in the power-saving mode according to an embodiment of the invention.

FIG. 6 is a flow chart of a method for adjusting a codec mode for power-saving in the power-saving mode according to an embodiment of the invention. In this embodiment, a plurality of Adaptive Multi-Rate (AMR) or AMR Wide Band (AWB) audio codec modes can be adopted. Generally, a higher AMR/AWB codec mode uses a higher bit rate. Therefore, in the embodiment, the process may begin by decreasing the codec mode to decrease the bit rate utilized for coding the voice data (Step S602). According to an embodiment of the invention, the processor 130 may send a corresponding command to direct the corresponding signal coding device, such as the DSP 150, to decrease the codec mode.

In the embodiments of the invention, the amount of decrease in the codec mode (or the bit rate) may vary with the estimated voice quality. For example, when the voice quality is much higher than the predetermined threshold, the codec mode decrease may be set larger, and when the voice quality is close to the predetermined threshold, the codec mode decrease may be set smaller.

Note that in some embodiments of the invention, a lookup table of codec mode versus estimated voice quality can be established in advance via several experiments, and the processor 130 may determine a codec mode corresponding to the current estimated voice quality via looking them up in the table. Note further that in the embodiments of the invention, before parameter adjustment, the current parameter configuration may be recorded in the memory device 140 such that the parameter configuration may be recovered as discussed above.

Next, the processor 130 may estimate the current voice quality perceived by the user of communications apparatus B after the parameter adjustment made in step S602, and check whether the estimated voice quality is higher than the predetermined threshold (Step S604). If yes, the processor may further check whether the adjustment has reached a limit (Step S606). For example, there may be a lowest codec mode/bit rate set as a limit. If yes, the process is ended and no more parameter adjustments will be made. If not, the process returns to step S602 to further decrease the codec mode. The parameter adjustment could be an iterative approach when the estimated voice quality is higher than the predetermined threshold.

On the other hand, when the estimated voice quality is not higher than the predetermined threshold after the parameter adjustment made in step S602, a suitable configuration is adopted (Step S608), so as to maintain a higher voice quality than the predetermined threshold. As discussed above, the suitable configuration may be determined or selected from one or more historical configurations that the processor adopted before, a previous configuration that the processor previously adopted, or the configurations that are defined or supported by the corresponding specifications or standards. These candidate configurations for determining or selecting the suitable configuration may be recorded in the memory device 140. According to an embodiment of the invention, the processor 130 may determine a suitable codec mode configuration from the candidate configurations and send a corresponding command to direct the corresponding signal coding device, such as the DSP 150, to adopt the suitable codec mode configuration.

According to another embodiment of the invention, the parameter may be transmission power utilized for transmitting the voice packets to communications apparatus B. To be more specific, the processor 130 may decrease the transmission power according to the estimated voice quality.

Figure 7:
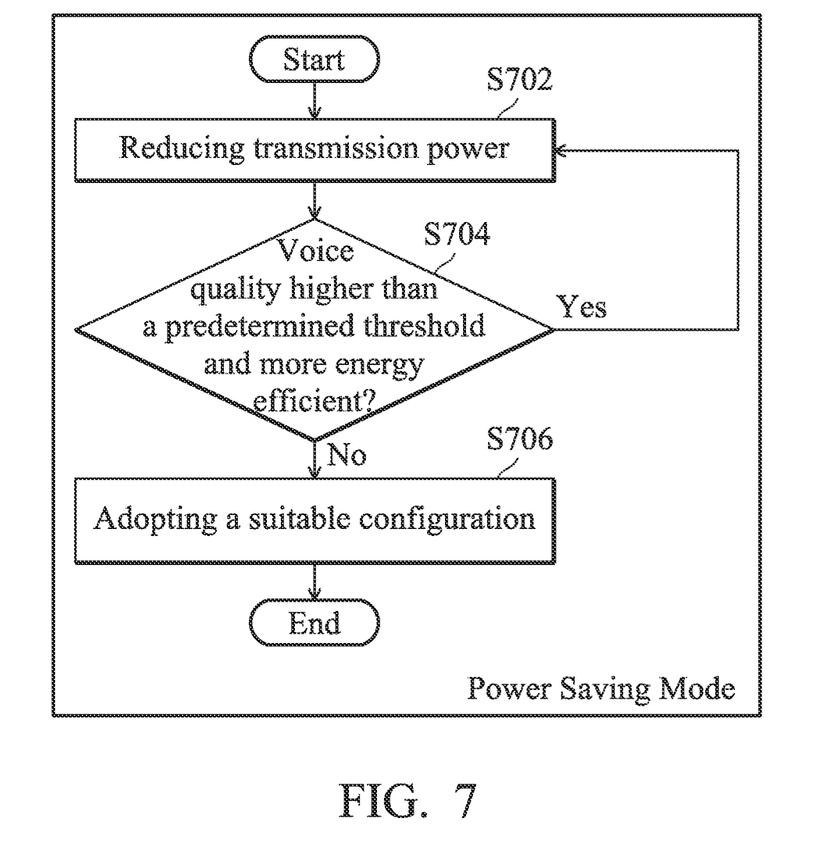
FIG. 7 is a flow chart of a method for power-saving in the power-saving mode according to another embodiment of the invention.

FIG. 7 is a flow chart of a method for power-saving in the power-saving mode according to another embodiment of the invention. In the embodiment, the process may begin by reducing the transmission power according to the estimated voice quality (Step S702). According to an embodiment of the invention, the processor 130 may send a corresponding command to direct the corresponding device, such as the baseband signal processing device 110, to reduce the transmission power.

In the embodiments of the invention, the amount of power reduction may vary with the estimated voice quality. For example, when the voice quality is much higher than the predetermined threshold, the amount of power reduction may be set larger, and when the voice quality is close to the predetermined threshold, the amount of power reduction may be set smaller. Note that in some embodiments of the invention, a lookup table of transmission power versus estimated voice quality can also be established in advance via several experiments, and the processor 130 may determine a transmission power corresponding to the current estimated voice quality via looking them up in the table. Note further that in the embodiments of the invention, before parameter adjustment, the current parameter configuration may be recorded in the memory device 140 such that the parameter configuration may be recovered as discussed above.

Next, the processor 130 may estimate a current voice quality perceived by the user of communications apparatus B after the parameter adjustment made in step S702, and check whether the estimated voice quality is higher than the predetermined threshold and whether the current transmission power configuration is more energy efficient than the previous one (Step S704). Note that when the transmission power is too low, retransmission may be required, causing energy inefficiency. Therefore, in step S704, whether the current transmission power configuration is more energy efficient than the previous one is further considered. The energy efficiency may be estimated by the transmission power and the number of transmissions and retransmission. If so, the process returns to step S702 to further reduce the transmission power. The parameter adjustment could be an iterative approach when the estimated voice quality is higher than the predetermined threshold.

On the other hand, when the estimated voice quality is not higher than the predetermined threshold or the energy is not more efficient after the parameter adjustment made in step S702, a suitable configuration is adopted (Step S706), so as to maintain a higher voice quality than the predetermined threshold. As discussed above, the suitable configuration may be determined or selected from one or more historical configurations that the processor adopted before, a previous configuration that the processor previously adopted, or the configurations that are defined or supported by the corresponding specifications or standards. These candidate configurations for determining or selecting the suitable configuration may be recorded in the memory device 140. According to an embodiment of the invention, the processor 130 may send a corresponding command to direct the corresponding signal coding device, such as the baseband signal processing device 110 and the RF signal processing device 120, to adopt the suitable transmission power configuration.

Note that in the embodiments of the invention, communications apparatus A may further consider the transmission power decision determined by the uplink (UL) power control. Transmission Power Control (TPC) command is used to adjust UE's (that is, communications apparatus A's) transmission power when eNB detects SNR value is lower than a threshold. The eNB would increase UE's transmission power by TPC command if UE autonomous decreases its transmission power. Therefore, in an embodiment of the invention, when applying the power-saving mechanism to reduce transmission power, the PH value in the power headroom report (PHR) Medium Access Control (MAC) Control Element (CE) is preferably decreased accordingly. For example, the PH value may be decreased, or set directly to 0 when applying the power-saving mechanism to reduce transmission power. Note that the transmission power reduction is preferably applied also on the Physical Uplink Shared Channel (PUSCH)/Physical Uplink Control Channel (PUCCH) and Sounding Reference Signal (SRS).

In another embodiment of the invention, when applying the power-saving mechanism as reducing the transmission power, the P field in the extended power headroom MAC CE is preferably set to 1, so that UE can allow a reduction of its transmission power without interrupting power control operation. The P field indicates whether the UE applies power backoff due to power management. Regarding illustration of the P field, reference may be made to the corresponding standard 3GPP TS 36.321 Sec. 6.1.3.6a Extended Power Headroom MAC Control Element.

According to yet another embodiment of the invention, the parameter may be a packet drop rate utilized for internally dropping the voice packets. To be more specific, the processor 130 may randomly drop one or more of the voice packets to reach the packet drop rate, and the one or more dropped voice packets will not be further processed by the baseband signal processing device 110 and thus will not be transmitted to communications apparatus B.

Figure 8:
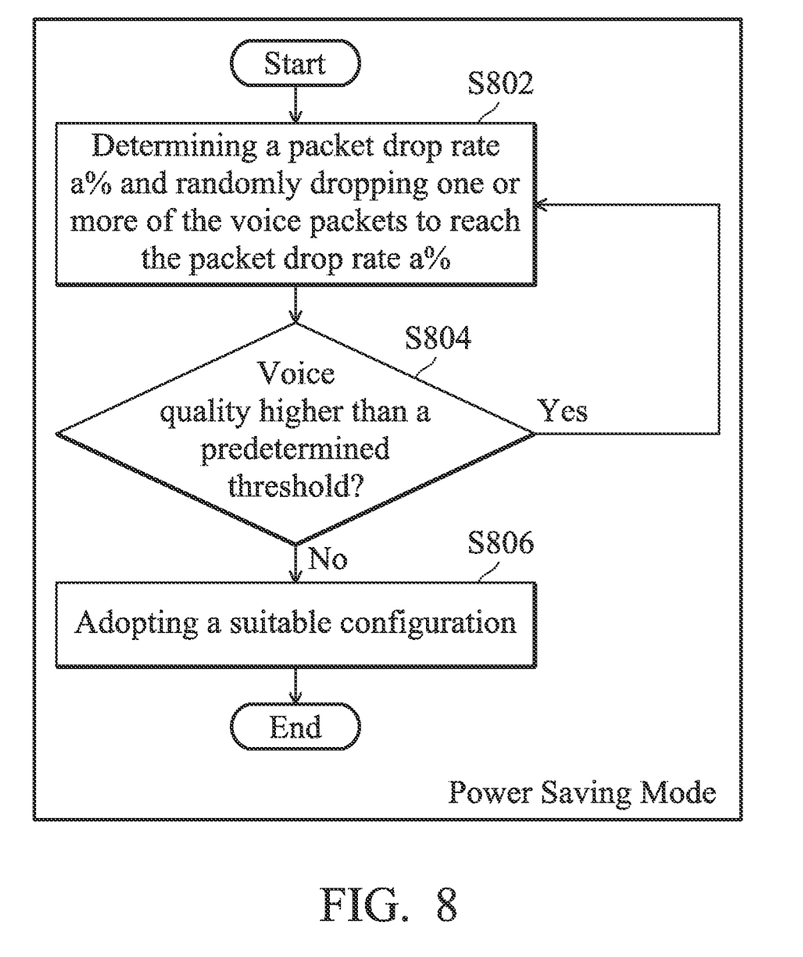
FIG. 8 is a flow chart of a method for power-saving in the power-saving mode according to yet another embodiment of the invention.

FIG. 8 is a flow chart of a method for power-saving in the power-saving mode according to yet another embodiment of the invention. In the embodiment, the process may begin by determining a packet drop rate a % according to the estimated voice quality and randomly dropping one or more of the voice packets to reach the packet drop rate a % (Step S802).

In the embodiments of the invention, a lookup table of packet drop rate versus estimated voice quality can be established in advance via several experiments, and the processor 130 may determine a packet drop rate corresponding to the current estimated voice quality via looking them up in the table. In other embodiments of the invention, the amount of adjustment in packet drop rate may vary with the estimated voice quality. For example, when the voice quality is much higher than the predetermined threshold, the amount of adjustment in packet drop rate may be set larger, and when the voice quality is close to the predetermined threshold, the amount of adjustment in packet drop rate may be set smaller. Note further that in the embodiments of the invention, before parameter adjustment, the current parameter configuration may be recorded in the memory device 140 such that the parameter configuration may be recovered as discussed above.

Next, the processor 130 may estimate a current voice quality perceived by the user of communications apparatus B after the parameter adjustment made in step S802, and check whether the estimated voice quality is higher than the predetermined threshold (Step S804). If yes, the process returns to step S802 to further determine a new packet drop rate. The parameter adjustment could be an iterative approach when the estimated voice quality is higher than the predetermined threshold.

On the other hand, when the estimated voice quality is not higher than the predetermined threshold, a suitable configuration is adopted (Step S806), so as to maintain a higher voice quality than the predetermined threshold. As discussed above, the suitable configuration may be determined or selected from one or more historical configurations that the processor adopted before, a previous configuration that the processor previously adopted, or the configurations that are defined or supported by the corresponding specifications or standards. These candidate configurations for determining or selecting the suitable configuration may be recorded in the memory device 140.

According to still another embodiment of the invention, the parameter may be the silence compression condition of Voice Activity Detection (VAD). To be more specific, the silence compression condition of VAD may be determined by some parameters comprising at least a power sum threshold, a noise level sum threshold and a hangover period. The processor 130 may adjust the silence compression condition of VAD by adjusting the VAD parameters according to the estimated voice quality. Regarding the illustrations of power sum threshold, noise level sum threshold and hangover period, reference may be made to the corresponding standard 3GPP TS 26.094.

Figure 9:
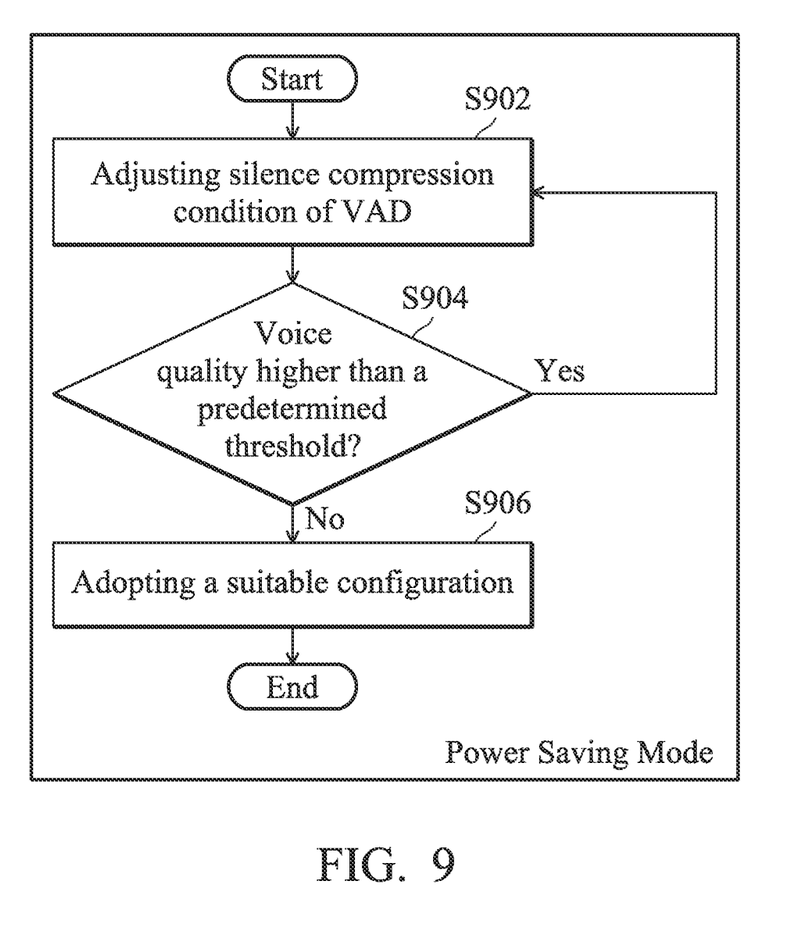
FIG. 9 is a flow chart of a method for power-saving in the power-saving mode according to still another embodiment of the invention.

FIG. 9 is a flow chart of a method for power-saving in the power-saving mode according to still another embodiment of the invention. In the embodiment, the process may begin by adjusting the silence compression condition of VAD according to the estimated voice quality (Step S902). According to an embodiment of the invention, the processor 130 may send a corresponding command to direct the corresponding signal coding device, such as the DSP 150, to adjust the VAD parameters.

In the embodiments of the invention, a lookup table of VAD parameters versus estimated voice quality can be established in advance via several experiments, and the processor 130 may determine the VAD parameters corresponding to the current estimated voice quality via looking up the table. In other embodiments of the invention, the amount of adjustment in VAD parameters may vary with the estimated voice quality. For example, when the voice quality is much higher than the predetermined threshold, the amount of adjustment in VAD parameters may be set larger, and when the voice quality is close to the predetermined threshold, the amount of adjustment in VAD parameters may be set smaller. Note that in the embodiments of the invention, before parameter adjustment, the current parameter configuration may be recorded in the memory device 140 such that the parameter configuration may be recovered as discussed above.

Next, the processor 130 may estimate a current voice quality perceived by the user of communications apparatus B after the parameter adjustment made in step S902, and check whether the estimated voice quality is higher than the predetermined threshold (Step S904). If yes, the process returns to step S902 to further adjust the silence compression condition of VAD. The adjustment could be an iterative approach when the estimated voice quality is higher than the predetermined threshold.

On the other hand, when the estimated voice quality is not higher than the predetermined threshold, a suitable configuration recorded in the memory device 140 is adopted (Step S906), so as to maintain a higher voice quality than the predetermined threshold. As discussed above, the suitable configuration may be determined or selected from one or more historical configurations that the processor adopted before, a previous configuration that the processor previously adopted, or the configurations that are defined or supported by the corresponding specifications or standards. These candidate configurations for determining or selecting the suitable configuration may be recorded in the memory device 140.

Figure 10:
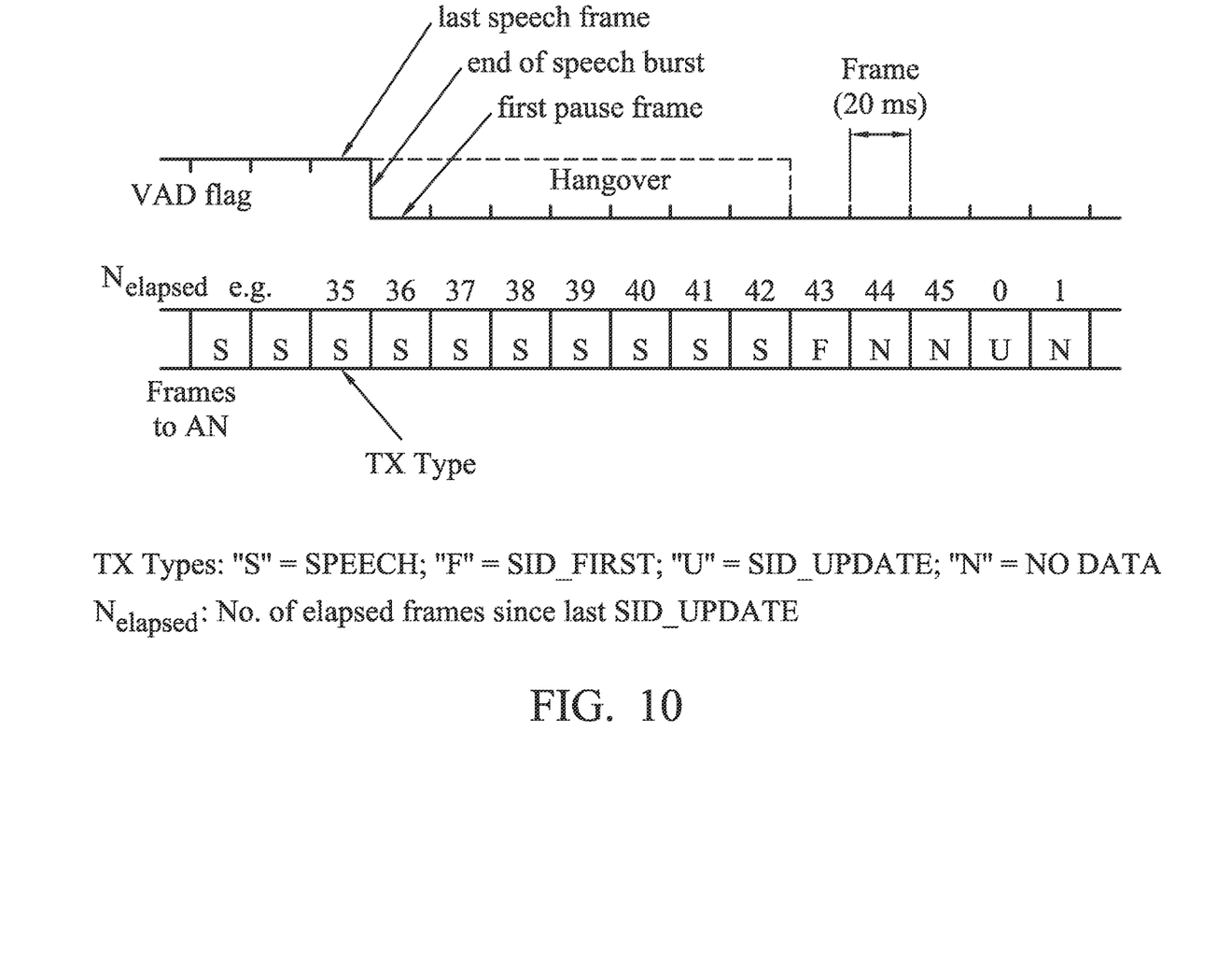
FIG. 10 shows an exemplary timing diagram of VAD according to an embodiment of the invention.

FIG. 10 shows an exemplary timing diagram of VAD according to an embodiment of the invention. When the VAD flag is pulled low, a hangover (or silence) period is entered. The hangover addition helps to detect low power endings of speech bursts, which are subjectively important but difficult to detect. The timing when entering the hangover period may be determined based on the power sum threshold and the noise level sum threshold. The power sum is the power of input frame. The noise threshold is the average level of the background noise estimate. Therefore, the silence compression condition of VAD may vary with the power sum threshold, the noise level sum threshold and the hangover period. After the hangover period, a Silence Insertion Descriptor first (SID_FIRST) frame is sent. Thereafter, only the SID update (SID_UPDATE) frame will be sent intermittently for notifying the counterpart that communications apparatus A is still alive in the voice connection.

Figure 11A:
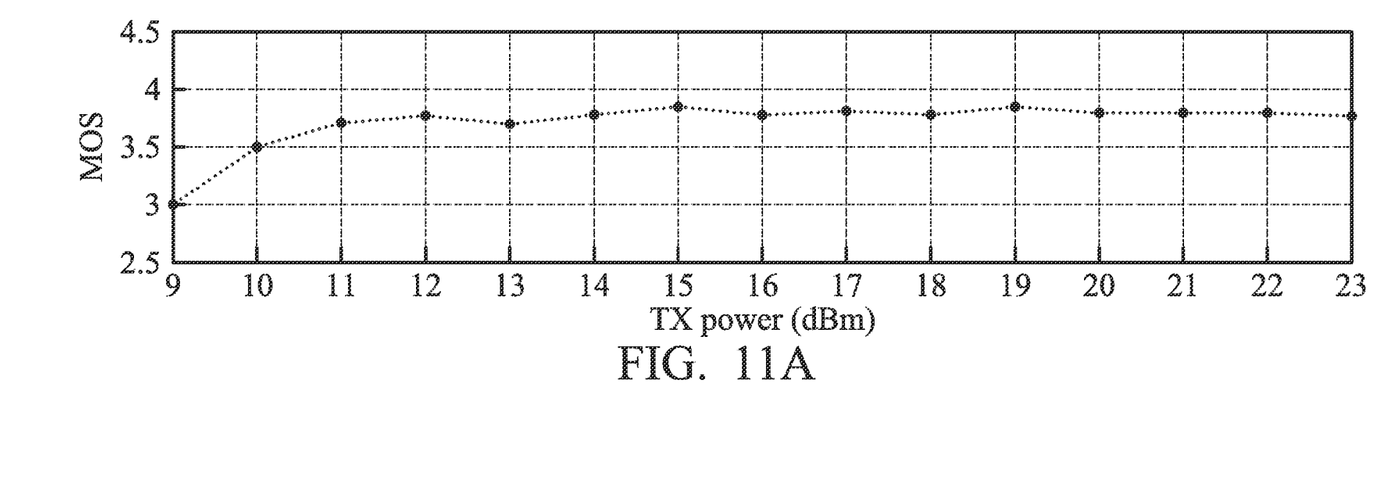
FIG. 11A shows the relationship of the transmission power versus the MOS according to an embodiment of the invention.

FIG. 11A shows the relationship of the transmission power versus the MOS according to an embodiment of the invention. As shown in FIG. 11A, when the transmission power is reduced from 23 dBm to 11 dBm, the MOS remains almost unchanged. However, the power consumption can be greatly improved.

Figure 11B:
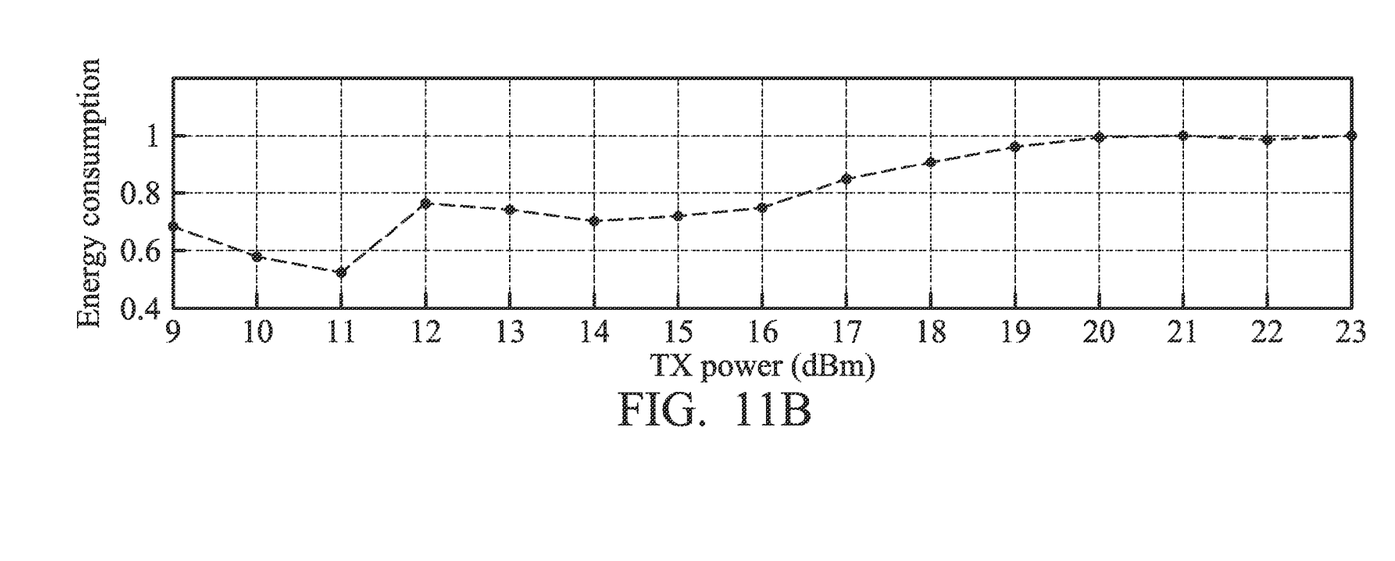
FIG. 11B shows the relationship of transmission power versus energy consumption according to an embodiment of the invention.

FIG. 11B shows the relationship of the transmission power versus the energy consumption according to an embodiment of the invention. As shown in FIG. 11B, the energy consumption reaches an optimum value when transmission power is 11 dBm. When the transmission power is further reduced, the energy consumption becomes worse since the number of retransmission may increase due to the low transmission power, causing the energy inefficiency problem. Therefore, checking whether the current transmission power configuration is more energy efficient than the previous one is required in step S704 to avoid the energy inefficiency problem due to low transmission power.

Figure 12:
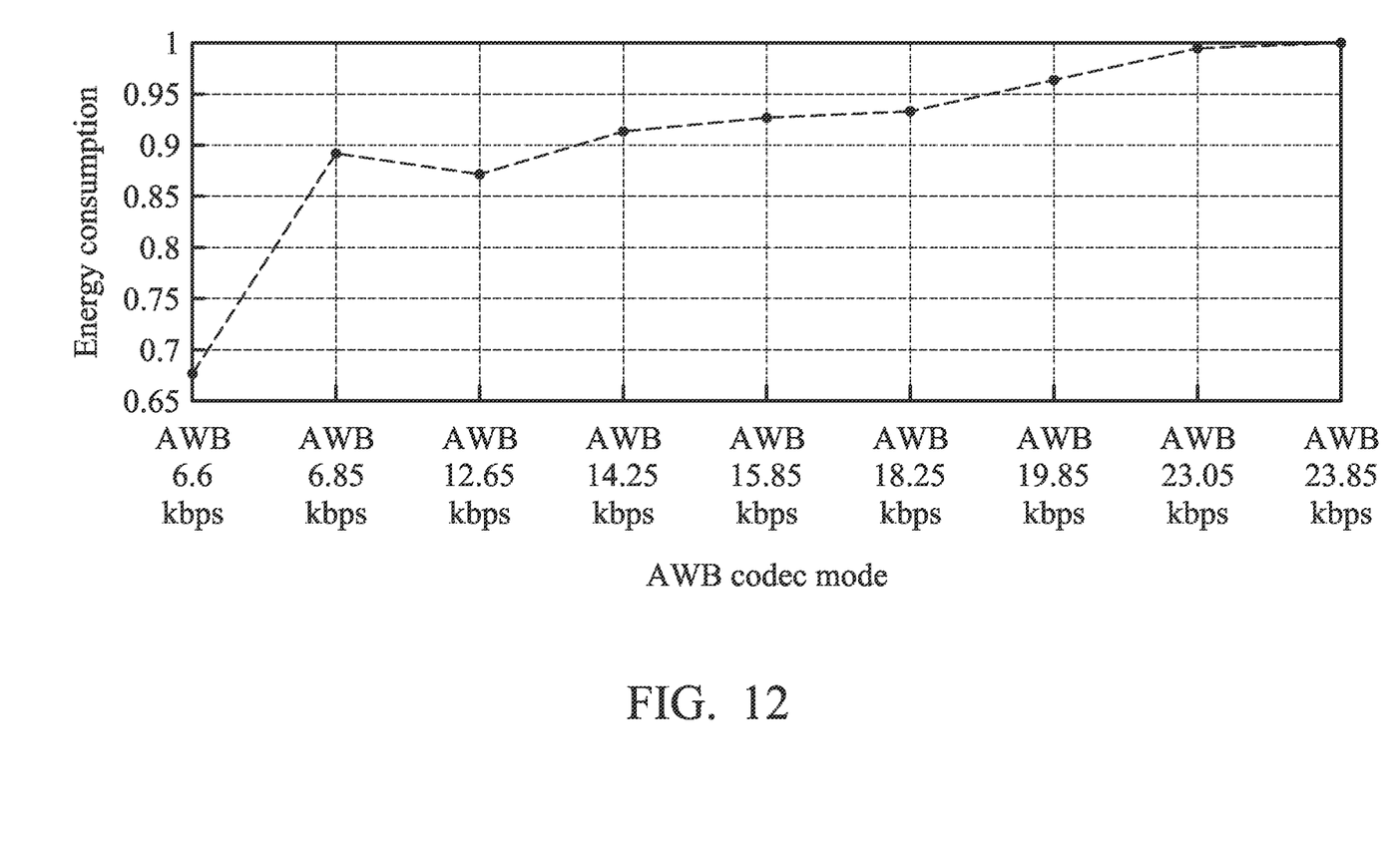
FIG. 12 shows the relationship of AWB codec mode versus energy consumption according to an embodiment of the invention.

FIG. 12 shows the relationship of the AWB codec mode versus the energy consumption according to an embodiment of the invention. As shown in FIG. 12, when the AWB codec mode is decreased from AWB 23.85 kbps to AWB 12.65 kbps, about 13% of energy consumption can be saved. When the AWB codec mode is decreased from AWB 23.85 kbps to AWB 6.6 kbps, about 67.6% of energy consumption can be saved.

Based on the proposed concepts, by applying the power-saving mechanisms as illustrated above, the power/energy consumption in voice communications can be greatly reduced and the voice quality of the voice communications can be maintained at a desirable level without causing discomfort to the users of communications apparatus A and B. Note that in the embodiments of the invention, more than one power-saving mechanisms may be applied at the same time, and the invention should not be limited thereto.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for reducing power consumption when a communications apparatus establishes voice communications with another communications apparatus, comprising:
estimating a voice quality perceived by a user of the another communications apparatus;
determining whether the estimated voice quality is higher than a predetermined threshold; and
adjusting at least one parameter utilized for processing a plurality of voice packets to be transmitted to the another communications apparatus according to the estimated voice quality to reduce the voice quality when the estimated voice quality is higher than the predetermined threshold;
wherein the at least one parameter is related to at least one of a power sum threshold utilized in Voice Activity Detection (VAD) and a noise level sum threshold utilized in Voice Activity Detection (VAD).

2. The method as claimed in claim 1, wherein the voice quality is estimated according to a packet loss rate of the voice packets and a packet delay of the voice packets received by the another communications apparatus.

3. The method as claimed in claim 2, further comprising:
receiving a Real time Transport Control Protocol (RTCP) frame from the another communications apparatus,
wherein information regarding the packet loss rate and the packet delay is obtained from the RTCP frame.

4. The method as claimed in claim 2, further comprising:
obtaining information regarding a downlink Packet Loss Rate (PLR) and packet delay low bounds guaranteed by operators,
wherein information regarding the packet loss rate and the packet delay are obtained from the downlink PLR and the packet delay low bounds.

5. The method as claimed in claim 1, wherein the parameter is related to a bit rate utilized for coding voice data comprised in the voice packets, and the parameter is adjusted by decreasing the bit rate according to the estimated voice quality.

6. The method as claimed in claim 1, wherein the parameter is related to transmission power utilized for transmitting the voice packets, and the parameter is adjusted by reducing the transmission power according to the estimated voice quality.

7. The method as claimed in claim 1, wherein the parameter is related to a packet drop rate utilized for internally dropping the voice packets, and the method further comprises:
randomly dropping one or more of the voice packets to reach the packet drop rate,
wherein the one or more dropped voice packets will not be transmitted to the another communications apparatus.

8. The method as claimed in claim 1, wherein the parameter is related to a hangover period utilized in Voice Activity Detection (VAD).

9. A communications apparatus, comprising:
a radio frequency (RF) signal processing device, arranged to process a plurality of RF signals for establishing voice communications with another communications apparatus;
a baseband signal processing device, arranged to process a plurality of baseband signals corresponding to the RF signals, wherein the baseband signals carry a plurality of voice packets comprising voice data to be transmitted to the another communications apparatus; and
a processor, coupled to the RF signal processing device and the baseband signal processing device, arranged to estimate a voice quality perceived by a user of the another communications apparatus and adjust at least one parameter utilized for processing the voice packets according to the estimated voice quality to reduce the voice quality when the estimated voice quality is higher than a predetermined threshold;
wherein the processor estimates the voice quality according to a packet loss rate of the voice packets and a packet delay of the voice packets received by the another communications apparatus, and the processor obtains information regarding the packet loss rate and the packet delay from a downlink Packet Loss Rate (PLR) and packet delay low bounds guaranteed by operators.

10. The communications apparatus as claimed in claim 9, wherein the processor obtains information regarding the packet loss rate and the packet delay from a Real time Transport Control Protocol (RTCP) frame received from the another communications apparatus.

11. The communications apparatus as claimed in claim 9, wherein the parameter is related to a codec mode utilized for coding the voice data, and the processor adjusts the codec mode according to the estimated voice quality.

12. The communications apparatus as claimed in claim 9, wherein the parameter is related to transmission power utilized for transmitting the voice packets, and the processor adjusts the transmission power according to the estimated voice quality.

13. The communications apparatus as claimed in claim 9, wherein the parameter is related to a packet drop rate utilized for internally dropping the voice packets, and the processor randomly drops one or more of the voice packets to reach the packet drop rate, and wherein the one or more dropped voice packets will not be processed further by the baseband signal processing device and will not be transmitted to the another communications apparatus.

14. The communications apparatus as claimed in claim 9, wherein the parameter is related to a power sum threshold, a noise level sum threshold or a hangover period utilized in Voice Activity Detection (VAD).

15. A method for reducing power consumption when a communications apparatus establishes voice communications with another communications apparatus, comprising:
estimating a voice quality perceived by a user of the another communications apparatus;
determining whether the estimated voice quality is higher than a predetermined threshold; and
adjusting at least one parameter utilized for processing a plurality of voice packets to be transmitted to the another communications apparatus according to the estimated voice quality to reduce the voice quality when the estimated voice quality is higher than the predetermined threshold;
wherein the voice quality is estimated according to a packet loss rate of the voice packets and a packet delay of the voice packets received by the another communications apparatus, and information regarding the packet loss rate and the packet delay are obtained from the downlink Packet Loss Rate (PLR) and the packet delay low bounds guaranteed by operators.

16. The method as claimed in claim 15, further comprising:

receiving a Real time Transport Control Protocol (RTCP) frame from the another communications apparatus, wherein information regarding the packet loss rate and the packet delay is obtained from the RTCP frame.

17. The method as claimed in claim 15, wherein the parameter is related to a bit rate utilized for coding voice data comprised in the voice packets, and the parameter is adjusted by decreasing the bit rate according to the estimated voice quality.

18. The method as claimed in claim 15, wherein the parameter is related to transmission power utilized for transmitting the voice packets, and the parameter is adjusted by reducing the transmission power according to the estimated voice quality.

19. The method as claimed in claim 15, wherein the parameter is related to a packet drop rate utilized for internally dropping the voice packets, and the method further comprises:

randomly dropping one or more of the voice packets to reach the packet drop rate, wherein the one or more dropped voice packets will not be transmitted to the another communications apparatus.

20. The method as claimed in claim 15, wherein the parameter is related to a power sum threshold, a noise level sum threshold or a hangover period utilized in Voice Activity Detection (VAD).

* * * * *